United States Patent [19]
Rostaing et al.

[11] Patent Number: 5,993,612
[45] Date of Patent: Nov. 30, 1999

[54] PROCESS FOR PURIFYING A GAS AND APPARATUS FOR THE IMPLEMENTATION OF SUCH A PROCESS

[75] Inventors: Jean-Christophe Rostaing, Buc; Jean-Claude Parent, Garches; Francis Bryselbout, St. Denis, all of France; Michel Moisan, Outremont, Canada

[73] Assignee: L'Air Liquide, Societe Anonyme Pour L'Etude Et L'Exploitation Des Procedes Georges Claude, Paris, France

[21] Appl. No.: 08/985,258

[22] Filed: Dec. 4, 1997

[30] Foreign Application Priority Data

Dec. 13, 1996 [FR] France .................. 96 15370

[51] Int. Cl.$^6$ .............. C01B 1/00; B01D 53/00; B01D 47/00; H05F 3/00
[52] U.S. Cl. .................. 204/158.2; 204/157.3; 204/164; 423/210
[58] Field of Search .............. 204/157.15, 158.2, 204/164, 157.3; 588/205, 210, 211, 212; 423/210

[56] References Cited

U.S. PATENT DOCUMENTS

| | | |
|---|---|---|
| 3,909,206 | 9/1975 | Katz .......................... 23/284 |
| 5,137,701 | 8/1992 | Mundt ........................ 423/210 |
| 5,453,125 | 9/1995 | Krogh ....................... 118/723 M |
| 5,750,823 | 5/1998 | Wofford et al. .............. 588/210 |

FOREIGN PATENT DOCUMENTS

| | | |
|---|---|---|
| 0781599 | 7/1997 | European Pat. Off. . |
| 0820801 | 1/1998 | European Pat. Off. . |
| 43 19 118 | 12/1994 | Germany . |

*Primary Examiner*—Kishor Mayekar
*Assistant Examiner*—Edna Wong
*Attorney, Agent, or Firm*—Burns, Doane, Swecker & Mathis, L.L.P.

[57] ABSTRACT

Provided is a process for purfying a gas. In the process, the gas to be purified flows through a hollow dielectric tube. An electric field in the gas to be purified is created by a traveling electromagnetic wave which travels in the dielectric tube and is suitable for creating, in the gas, an atmospheric-pressure plasma which is not in local thermodynamic equilibrium, for the purpose of dissociating impurities in the gas in order to form reactive compounds. The formed reactive compounds are reacted with a corresponding reactive material for eliminating the reactive compounds from the gas to be purified.

22 Claims, 5 Drawing Sheets

PROCESS FOR PURIFYING A GAS AND APPARATUS FOR THE IMPLEMENTATION OF SUCH A PROCESS

BACKGROUND OF THE INVENTION

1. Field of the Invention

The present invention relates to a process for purifying a gas, in particular a plasmagenic rare gas, intended for example for the purification of krypton and xenon containing tetrafluoromethane and methane, and a purification apparatus for implementing such a process.

Rare gases are generally extracted from air by distillation. After distillation, they contain impurities that have to be extracted before they are used.

2. Description of the Related Art

Thus, in the case of krypton and xenon, the impurities mainly consist of tetrafluoromethane ($CF_4$) and methane ($CH_4$) at levels which may be as high as several hundreds of parts per million by volume (ppmv). The commonest applications of these rare gases require high-purity products and the presence of these foreign molecules is an unacceptable drawback for these applications.

For example, krypton is widely used for the partial-vacuum filling of filament lamps. In this application, the very high temperature to which the tungsten filament in these lamps is heated is sufficient to cause dissociation of the tetrafluoromethane into highly corrosive fluorinated radicals, which causes rapid degradation of the filament by etching of the metal.

Furthermore, methane is also dissociated under these temperature conditions and generates unstable gaseous precursors which form carbon-containing solid deposits of a brownish appearance on the internal surface of the bulb.

As is known and for technical reasons, the purification of rare gases cannot be accomplished by distillation.

The purification techniques known hitherto are essentially based on thermal phenomena.

Such techniques allow $CH_4$ to decompose and/or oxidize easily, but they are unsuitable for eliminating $CF_4$, which is an extremely stable and barely reactive molecule.

Moreover, since the $CF_4$ molecule does not react significantly with any solid or liquid medium at room temperature, the chemical conversion of $CF_4$ requires very high reaction temperatures to be reached and a considerable enthalpy to be transferred to the gaseous medium.

If a combustion technique is used, very high flow rates of combustible gas, generally hydrogen, are required, which raises treatment-cost problems, safety problems and plant-constraint problems because of the heat released. Moreover, such a technique is not suitable for reducing already low impurity concentrations to a negligible level.

Another known purification technique is based on thermochemical decomposition by reaction over a suitable metal, for example zirconium. This technique is relatively effective and does not require a very large supply of combustible gas. However, it has many disadvantages, in particular because of the fact that it is not possible to purify gases with a high flow rate and that its implementation requires an apparatus which takes up a lot of room.

Furthermore, this technique requires quite a high operating temperature, for example about 900 to 1000° C., and the beds of metals used are very expensive and have a limited lifetime.

For the reasons explained above, the purification of rare gases currently constitutes the main cause of limited efficiency of lines for producing these gases.

SUMMARY OF THE INVENTION

The object of the invention is to provide a gas purification process and a purification apparatus for the implementation of such a process helping to overcome the abovementioned drawbacks.

The subject of the invention is therefore a process for purifying a gas, characterized in that it includes the steps consisting in:

making the gas to be purified flow through a hollow dielectric tube;

creating an electric field in the gas by means of a travelling electromagnetic wave which travels in the dielectric tube and is suitable for creating, in the gas, an atmospheric-pressure plasma which is not in local thermodynamic equilibrium for the purpose of dissociating the impurities in the gas in order to form reactive compounds; and making the reactive compounds formed react with a corresponding reactive element for the purpose of eliminating them from the gas to be purified.

The process according to the invention may furthermore include one or more of the following characteristics:

the electromagnetic wave is a surface wave produced by means of a surface-wave exciter of the surfatron-guide type;

the electric field being created in a region of the dielectric tube, it furthermore includes a step of adjustment of the longitudinal dimension of the region in order to adjust the length of the plasma;

oxygen is added to the gas to be purified, prior to the step of making the gas flow through the dielectric tube;

the step consisting in making the reactive compounds react consists in making the reactive compounds react with an alkaline element, in particular soda lime or an alkaline aqueous solution;

the process furthermore includes a step of dehydration of the gas after the step of reacting the reactive compounds with a corresponding reactive element;

the rare gas to be purified is composed of krypton or of xenon;

the impurities in the gas are selected from methane and perfluorinated gases, in particular tetrafluoromethane.

The subject of the invention is also an apparatus for purifying a gas, for the implementation of a purification process, characterized in that it includes at least one high-frequency travelling-wave exciter combined with a waveguide suitable for guiding the travelling waves produced by the at least one wave exciter to at least one hollow dielectric tube in which the gas is intended to flow, in order to create therein an atmospheric-pressure plasma for ionizing and exciting the molecules of the gas to be purified for the purpose of dissociating the impurities in the gas in order to form reactive compounds, in particular fluorinated compounds, and at least one unit for treating the reactive compounds being arranged on the exit side of a corresponding hollow dielectric tube.

This apparatus may furthermore include one or more of the following characteristics:

each exciter consists of a surface-wave exciter and a cylindrical sleeve made of conductive material, inside which is mounted a corresponding dielectric tube, and includes a region for concentrating the incident waves in a space lying between the internal wall of the exciter and a free end of the sleeve for the purpose of creating therein an electric field coaxial with the tube;

the sleeve includes an inner cylinder, in which the dielectric tube is mounted, and an outer cylinder which, with the inner cylinder, delimits a cooling chamber supplied with a liquid coolant;

the sleeve and the dielectric tube are separated by a cylindrical space and the apparatus includes means for supplying the space with a gaseous coolant;

the dielectric tube consists of silica;

each exciter is provided with impedance-adjustment means which include a plunger forming a quarter-wave trap which is coaxial with the sleeve and mounted so as to be able to move axially in the exciter;

the apparatus furthermore includes means for adjusting the longitudinal dimension of the plasma created in the hollow dielectric tube;

the wall of each exciter is thinned down close to the incident-wave concentration region;

the thinned-down part of the wall of each exciter consists of an added piece welded to the rest of the wall;

the at least one unit for treating the reactive compounds each consist of a soda-lime cartridge;

the apparatus includes a humidifier arranged upstream of the soda-lime cartridge;

the apparatus furthermore includes a unit for dehydrating the gas to be purified, arranged downstream of the unit for treating the reactive compounds;

the surface-wave exciters each consist of an exciter of the surfatron-guide type.

BRIEF DESCRIPTION OF THE DRAWINGS

Other features and advantages will emerge from the following description, given solely by way of example and with reference to the appended drawings, in which.

DETAILED DESCRIPTION OF THE PREFERRED EMBODIMENTS OF THE INVENTION

Figure 1:
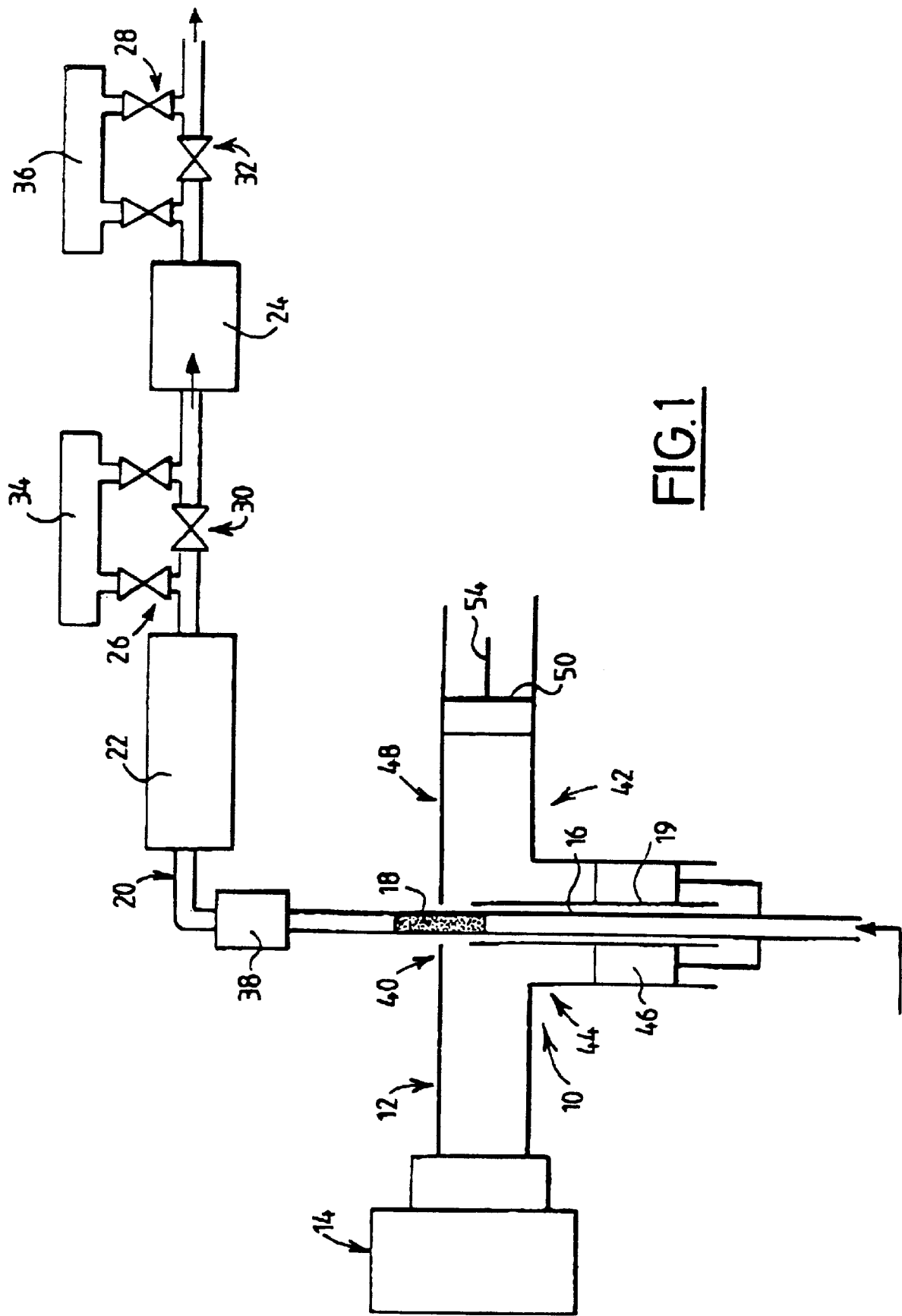
FIG. 1 is a diagrammatic view of a gas purification apparatus according to the invention in the case in which the electric-field applicator is a surface-wave exciter of the surfatron-guide type.

FIG. 1 shows a diagrammatic view of an apparatus for purifying plasmagenic gases, in particular rare gases such as krypton or xenon.

The description of the purification apparatus which follows and of its operation applies to the purification of krypton and of xenon.

Of course, the invention also applies to the treatment of other gases, such as Ar, $N_2$, Ne, Kr, Xe, He, $O_2$, $CO_2$ and $H_2$, or a mixture of these gases.

The object of this apparatus is to place the plasmagenic gas to be treated in an electric field which is high enough to produce an electric discharge by ionization of the gas molecules, caused by electrons being stripped from the initially neutral gas molecules.

By plasmagenic gas is meant a gas in which the discharge is created due to the effect of the electric field, and the properties of the discharge therein, namely the electronic distribution and the physico-chemical parameters are determined by the gas in which the discharge is created.

The possibility of creating, due to the effect of the electric field in the gas to be purified, a discharge having properties suitable for implementing the invention is essentially governed by the nature of this gas and is relatively independent of that of the impurities in so far as their concentration remains low, typically of about a few hundreds of ppmv.

Due to the effect of the discharge, the gas molecules are dissociated to form radicals, having sizes which are smaller than the initial molecules, and, consequently, individual atoms.

The atoms or, depending on the case, the molecules of the gas to be purified are excited and the molecules are dissociated in the discharge into atoms or molecular fragments. However, the excited and/or dissociated species give rise to practically no chemical reaction, either because of their intrinsic nature (rare gas) or because a large quantity of another gas, capable of reacting with the gas to be treated, has not been introduced into the discharge. After passing through the discharge, the atoms or molecules of the gas to be purified become de-excited and/or recombine, and thus are again intact on leaving the discharge.

In contrast, the impurities which, as described above, are molecules detrimental for a subsequent process using the gas to be purified and are present in small quantities, undergo dissociation, by excitation, and irreversible transformation by forming new molecular fragments having chemical properties differing from those of the initial molecules, which molecular fragments are either capable of being treated, by reaction on a suitable solid or a suitable liquid, or condense immediately and spontaneously into solid deposits or particles.

According to one embodiment of the invention, the purification apparatus is intended to be mounted on the exit side of an air distillation plant for extracting krypton and xenon, for the purpose of destroying the molecules of impurities such as $CF_4$ and $CH_4$, converting these impurities into reactive gaseous compounds capable of being treated by the action of corresponding reactive compounds. It may also be mounted downstream of a plant for separating krypton and xenon by distillation. Finally, it may constitute an independent purification apparatus supplied from bottles in which krypton or xenon, or a mixture of these two gases, are stored under pressure.

In order to effect this purification, the apparatus according to the invention includes a high-frequency field applicator device denoted by the numerical reference 10, consisting of a surface-wave exciter connected via a waveguide 12 to a microwave generator 14.

The apparatus furthermore includes, combined with the surface-wave exciter 10, a discharge tube 16 made of a dielectric material, such as silica, through which a plasmagenic gas to be purified flows.

The surface-wave exciter 10, also called a high-frequency field applicator, consists of an applicator of the surfatron-guide type which, in conjunction with the waveguide 12, guides the microwave radiation created by the microwave generator 14 to the discharge tube 16 in order to create a plasma 18 in the gas to be purified.

FIG. 1 also shows that the discharge tube 16 is arranged in a sleeve 19 made of conductive material, the structure of which will be described in detail below with reference to FIG. 2.

It is connected downstream, with respect to the direction of flow of the gas to be purified, outside the field applicator 10, to a line 20 for conveying the excited gas to a treatment unit 22, consisting of a cartridge containing an alkaline element such as soda lime or an alkaline aqueous solution, and of a gas dehydration unit 24.

Moreover, the line 20 includes two branch-off units 26 and 28 which are controlled by corresponding valves, such as 30 and 32, and on which are mounted, in a sealed manner, sampling cells 34 and 36 for the purpose of analysing the gases using Fourier transform infrared spectrometry.

These cells are (SPECTRA-TEC single-passage-type cells having a length of approximately 100 mm, giving a detection limit which is amply sufficient for the envisaged application. They are made of stainless steel in order to avoid the generation of additional products which would appear in the case of a cell made of silica which is capable of being attacked by some of the fluorinated products after the gas has passed through the discharge created in the tube 16. The windows of the cells are made of $BaF_2$, a material which has a very low absorbance in the relevant range of wavelengths for analysis by infrared spectrometry.

Finally, FIG. 1 shows that the discharge tube 16 is connected to the line 20 via a cooling cartridge 38, the structure of which will be described in detail later with reference to FIG. 3.

The surface-wave applicator 10 will now be described with reference to FIG. 2.

As mentioned previously, the applicator 10 preferably consists of a surfatron-guide applicator.

It includes a first part 40, forming a waveguide proper and intended for propagating the microwave radiation guided by the waveguide 12 and incident in the direction denoted by the arrow F in this figure, and a coaxial second part called the impedance-matching part 42 which is itself composed of a substantially cylindrical first part 44, coaxial with the discharge tube 16, in which is mounted, so as to be able to move axially, a tuning plunger 46 forming a quarter-wave trap, and a second part 48 which is also substantially cylindrical, arranged in the extension of the waveguide 12 and provided with a movable waveguide plunger 50, shown in FIG. 1.

Figure 2:
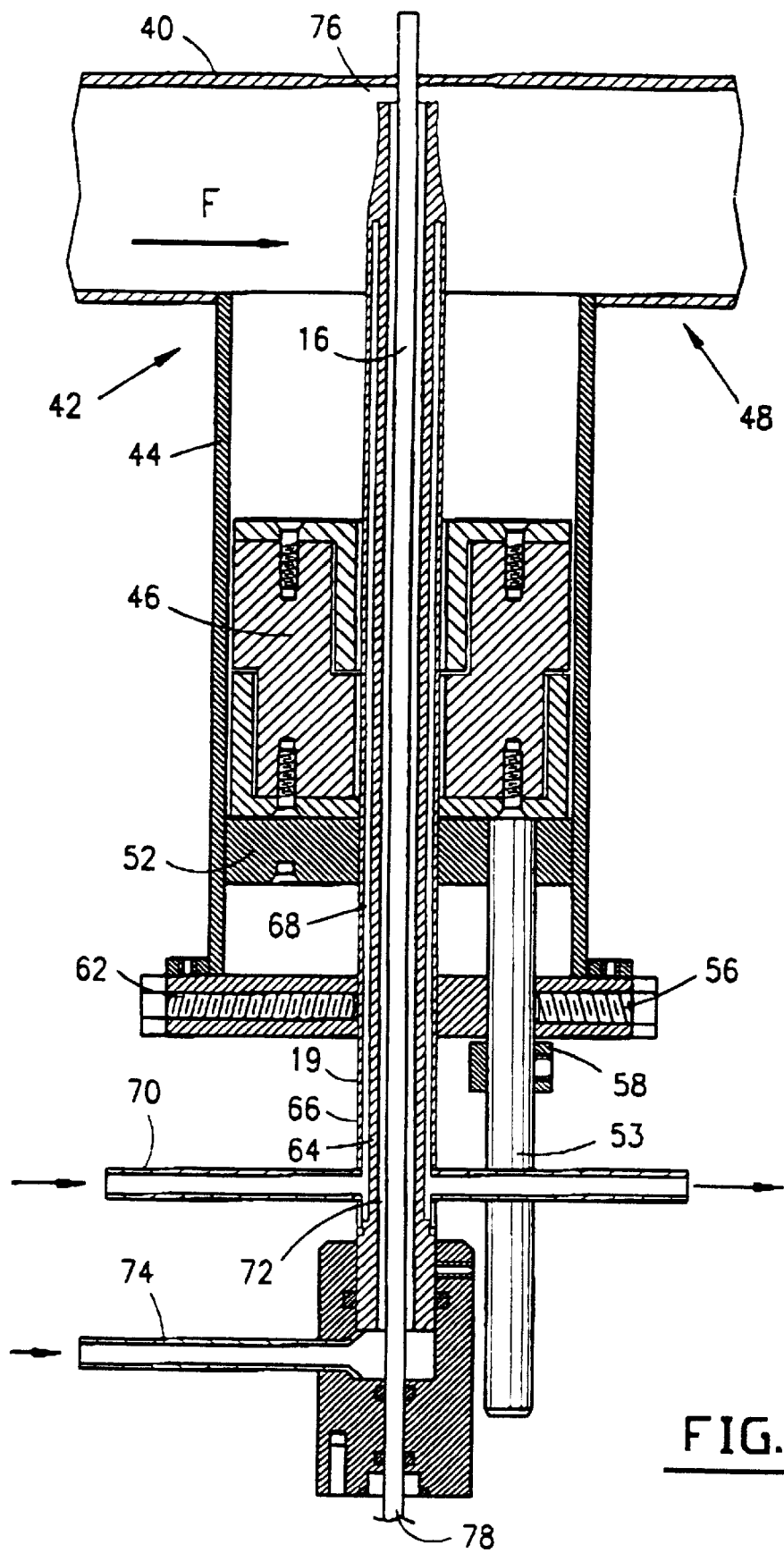
FIG. 2 is a longitudinal sectional view of the treatment reactor of the apparatus in FIG. 1, showing the plasma exciter.

It may be seen in FIG. 2 that the tuning plunger 46 is fixed to a sliding washer 52 advantageously made of Teflono® (polytetrafluoroethylene, PTFE).

The surfatron-guide 10 is furthermore provided with means for controlling the adjustment of the axial position of the plungers 46 and 50, these means consisting of rods 53 and 54 which can be operated manually by an operator or provided with motor means, for the purpose of impedance-matching the microwave-generator/waveguide system to the surfatron-guide/plasma system by adjusting the position of the tuning plunger 46 and of the waveguide plunger 50.

It should be pointed out that the coaxial tuning plunger 46 provides contactless short-circuiting by means of a quarter-wave trap allowing high-performance operation as well as virtually no maintenance.

Furthermore, a screw 56 is provided in the body of the surfatron-guide 10 for the purpose of locking the tuning plunger 46 in position after having carried out the adjustment.

It may furthermore be seen in FIG. 2 that a stop 58 for limiting the axial movement of the tuning plunger 46 is provided on the corresponding control rod 53 for the purpose of presetting the tuning.

As mentioned previously, the surfatron-guide is provided on the inside with a cylindrical sleeve 19, inside which a discharge tube 16 is placed. It is mounted so as to be able to move axially with respect to the first part 44 coaxial with the discharge tube 16 and with the tuning plunger 46, for the purpose of adjusting the width of the launching gap of the surfatron-guide.

Furthermore, the body of the surfatron-guide 10 includes a device for holding the sleeve 19 in position, consisting of a transverse screw 62.

The sleeve 19 has two coaxial walls 64 and 66 which between them delimit a cylindrical chamber 68 which communicates with a water-cooling circuit 70, shown partially in FIG. 2, and allowing the sleeve 19 to be cooled during the discharge in the tube 16.

Moreover, the discharge tube 16 together with (polytetrafluoroethylene, PTFE) the inner wall 64 of the sleeve 19, delimits a substantially cylindrical gap 72 connected to a line 74, (shown partially) for supplying gas under pressure, for the purpose of causing a stream of gas forced into the gap 72 between the discharge tube 16 and the sleeve 19 in order to provide additional cooling. The gaseous coolant is, for example, air under pressure, formed by a compressor.

These cooling means are necessary for operating at atmospheric pressure, at which the plasma reaches temperatures markedly lower than those of the electrons in the gas but nevertheless capable, in the absence of cooling, of causing the discharge tube 16 to melt.

Finally, it may be seen in FIG. 2 that a free end of the sleeve 19 emerges into the waveguide 40 and, together with the inner wall of the latter, delimits a gap 76 by means of which the microwave energy localized at this point is transmitted to the plasma via a surface wave.

It should be pointed out that the cross-section of the wall of the surfatron-guide 10 close to the gap 76 is thinned down to a thickness of between 0.5 and 0.7 mm by removing material from the outer wall of the waveguide 12 so as not to interfere with excitation of the surface waves, without which significant losses of microwave power would occur through heating in the structure making up the wall of the waveguide 12.

It should also be pointed out that the gap 76 can be adjusted by moving the sleeve 19 axially in the coaxial first part 44 and by locking it using the screw 62. This adjustment makes it possible to optimize the impedance matching, by preventing the formation of an electric arc in the gap 76 when the apparatus is operating at high microwave power.

Finally, the free end 78 of the discharge tube 16 is connected to a source of the gas to be treated, not shown, consisting, for example of an air distillation plant, so as to make this gas flow through the surfatron-guide.

In operation, the microwave radiation produced by the generator 14 is guided by the waveguide 12 to the surfatron-guide 10 which concentrates the incident radiation in the gap 76 so as to propagate, in the discharge tube 16 and in the gas mixture which it contains, a travelling electromagnetic surface wave whose associated electric field generates and maintains a discharge in the gas mixture.

It should be pointed out that the construction of the surfatron-guide 10 allows the electric field of the incident wave to be communicated to the plasmagenic gas along the axial direction of the discharge tube 16 through the gap 76.

The plasma thus generated in the gas to be purified is in the form of a column and its electron density decreases on going away from the gap according to a known function.

Preferably, in order to obtain quite a long residence time of the particles of impurities, so as to modify almost all these impurities, the apparatus is completed by means for adjusting the longitudinal dimension of the plasma in the discharge tube 16. These means consist of a device for adjusting the microwave power, with which the microwave generator 14 is conventionally equipped; this device making it possible to adjust the longitudinal dimension of the region in which the electric field is created, the length of this region increasing, in a known manner, when the power is increased.

Moreover, it should be pointed out that the diameter of the discharge tube 16 is chosen to be small enough, for example with an external diameter equal to 8 mm and an internal diameter equal to 4 mm, to obtain a single plasma filament which is centered on the axis of the tube and which can be established in a stable and reproducible manner.

This is because, when operating at atmospheric pressure, in particular with gases having a low thermal conductivity such as xenon, krypton and argon, in the case of sufficiently large diameters, the diameter of the plasma itself does not increase when the internal diameter of the tube is increased, so that the gas to be treated which is flowing at the periphery of the tube would be subjected to an increasingly attenuated excitation.

Furthermore, several plasma filaments could form, with erratic behaviour and the possibility of sticking against the wall of the discharge tube, which could cause the latter to be damaged.

However, it is conceivable, in order to increase the permissible flow rates, to combine several small-diameter discharge tubes in parallel, each having its field applicator for generating the plasma, and subsequently to treat the total flow of gas over a single reactive element. It is also possible, in order to increase the residence time of the molecules in the plasma medium, to create several discharges in series in the same tube by means of several field applicators.

As mentioned previously, the arrangement which has just been described makes it possible to create, in the path of a plasmagenic gas to be purified and in the latter, a plasma which is the site of very high electron-energy excitations, corresponding to temperatures of several tens of thousand kelvin, thus allowing, by electron collision, excitation of the atoms and molecules making up the gas, and in particular conversion of the molecules of impurities such as $CF_4$ and $CH_4$ from a relatively chemically stable state to a reactive state, thereby enabling them to be eliminated subsequently, either after their immediate and spontaneous condensation into the form of solid deposits or particles (fluorocarbon polymers, carbon black, etc.), or by making them react with a corresponding solid or liquid reactant, as will be described later. It will be understood that the atoms and molecules of the gas to be purified are also excited in the discharge, but they undergo de-excitation and/or recombination immediately on leaving the latter and, moreover, they do not react with the solid or liquid reactive compounds over which the gas to be purified subsequently flows.

It should be noted that the plasma created by this apparatus is a plasma not in local thermodynamic equilibrium (LTE).

In this type of plasma, only the electrons present in the medium are raised to high energies, the temperatures of the ionic and neutral species remaining much lower, indeed for certain species quite close to ambient temperature.

In a system which is not in thermodynamic equilibrium, a large number of different states may be attained by varying the discharge parameters, for example the frequency of the electromagnetic field, the diameter of the discharge tube, the absorbed microwave power density and the composition of the gas to be treated by adding assistant gases thereto.

On the other hand, if we consider the case of plasmas in local thermodynamic equilibrium (LTE), in which all the species are at the same very high temperature, the total reaction balance is not always favourable for accomplishing a particular chemical conversion process, and in particular, it cannot be modified by varying discharge parameters.

As in any system in local thermodynamic equilibrium, the final state of the conversion is essentially determined by the temperature of the entire system.

Undesirable reaction pathways may be favoured in this case, as well as the elementary conversions of use to the desired result. In addition, the very high enthalpy of the medium leads to plant constraints (cooling, etc.) and maintaining this enthalpy is very costly in terms of energy.

It may therefore be imagined that the discharges produced in this apparatus, which is not in local thermodynamic equilibrium, are both energetically more effective and offer the possibility of finding more optimized operating conditions for carrying out the conversion of the molecules envisaged.

Furthermore, by adjusting the length of the plasma in the discharge tube 16, it is possible to adjust the residence time of the molecules and impurities, necessary for converting them into reactive species, to a value just sufficient to bring the residual concentration of impurities at the end of treatment to a level fixed in advance, thereby minimizing the electrical consumption of the system.

As mentioned previously, a cooling unit 38 is interposed between the discharge tube 16 and the line 20 for the purpose of removing heat from the connection region. This is because, in the case of krypton, a very intense evolution of heat is observed, not within the dielectric tube but immediately after its connection to the line 20, in a region which lies a few tens of cm downstream of the discharge. This phenomenon may be explained by the delayed de-excitation of metastable energy states in krypton, because of the high velocity of the gas in the discharge tube (high flow rate and small diameter).

It is also possible that the de-excitation occurs preferentially in a line made of metal or of polymer, compared to the silica tube.

Without cooling means, the line 20 rapidly reaches temperatures incompatible with maintaining its integrity, even if it is made of stainless steel (the metal becomes red hot after a few minutes of operation). The apparatus therefore includes, on the exit side of the discharge tube, a heat exchanger consisting of a copper or stainless-steel coil in which the gaseous stream to be treated flows, the said coil being contained in a steel enclosure inside which water circulates.

The heat exchanger is designed so that the temperature of the line on the exit side of the latter remains sufficiently moderate during steady-state operation, typically below 100° C.

Furthermore, the need to provide a movable connection between the discharge tube and the heat exchanger requires the use of sealing ferrules made of polymeric material (Teflon®), the heat-up of which must absolutely be limited. This is why a cooling cartridge, for cooling the connector by circulating water, is also provided, and this will be explained in detail.

Figure 3:
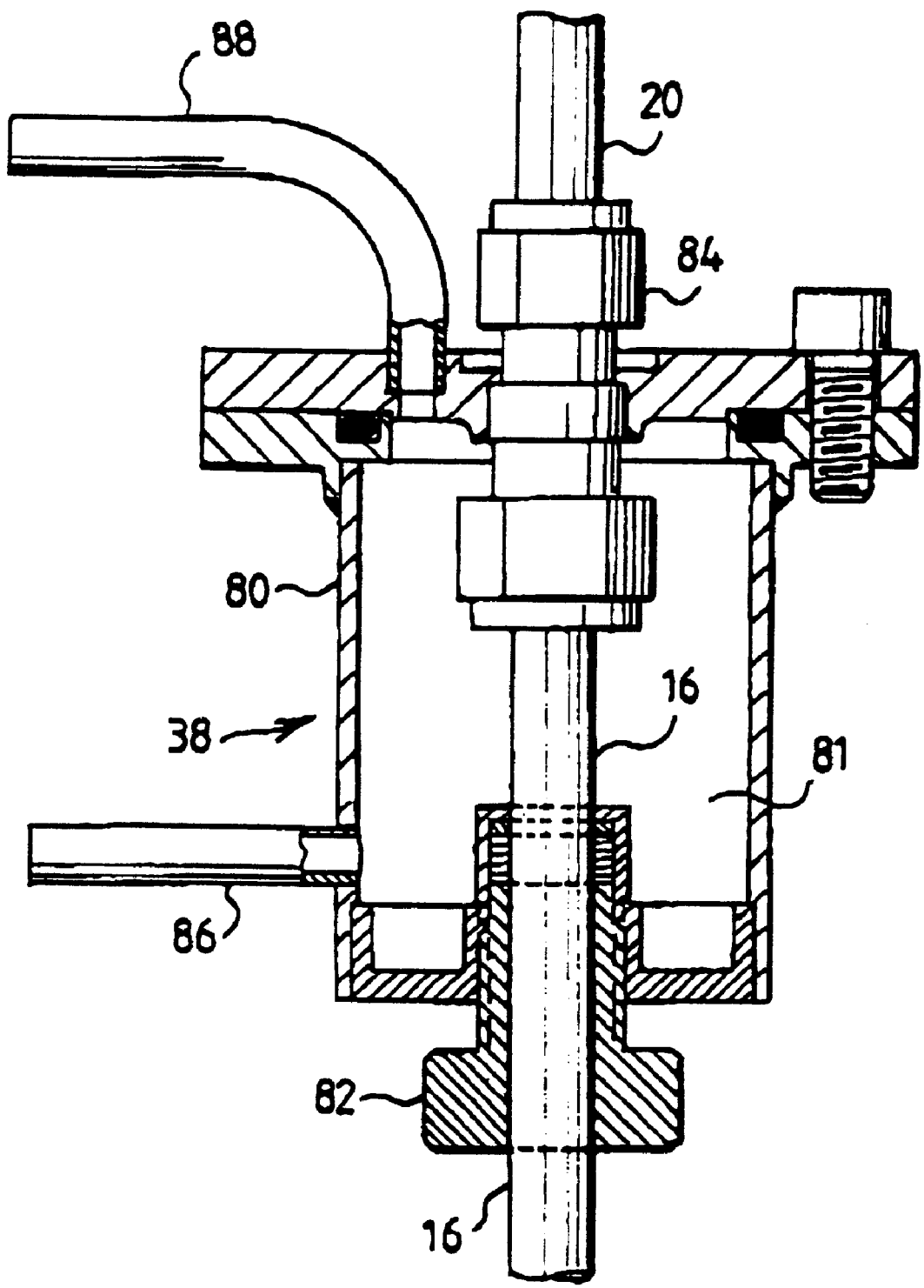
FIG. 3 is a detailed view of part of the apparatus in FIG. 1, showing the connection between the dielectric tube and the rest of the treatment circuit.

Referring to FIG. 3, it may be seen that the cooling cartridge includes a casing 80 delimiting subsequently a chamber 81 and provided at one of its ends with a connector 82 for fixing it to the discharge tube 16 and at its opposite end with a flange 84 for joining the discharge tube 16 to the line 20.

Moreover, the cartridge 38 is provided with a pipe 86 for letting water into the chamber 81 and with a water outlet pipe 88.

In operation, the gas flowing through the discharge tube 16 exchanges heat with the water present in the chamber 81, thus allowing the integrity of the (Teflon®) ferrules 89 (not shown) of the connector. It should also pointed out that, for continuous operation over long periods, it is preferred to make the line 20 from stainless steel 316L rather than from a polymer which is highly resistant to corrosive media, such as (Teflon®) PFA (Perfluoroalkoxy resin). This is because it seems to be more satisfactory to replace, from time to time, a metal line, which corrodes relatively slowly because of a low concentration of acid species, rather than to risk an incident caused by the polymer overheating.

Experimental results will now be given with reference to FIGS. 4 and 5 which show, respectively, the infrared absorbance spectrum as a function of the wavenumber of the krypton as it leaves the apparatus when there is no discharge and when there is a discharge, these results being obtained using the sampling cells 34 and 36.

The analysis performed in these cells 34 and 36 is carried out only after a stable operating regime of the apparatus has been established, so as to avoid taking into account any transient phenomenon which may in particular result from adsorption/desorption processes on the internal walls of the circuit or on the bed of soda lime.

During this stabilization phase, the cell is isolated and the gas flows through the corresponding bypass branches. The sequences of opening and closing the valves, in order to sample the gas, are reproduced identically and a check is made that there is always a constant pressure in the cell.

A reference spectrum is recorded using a cell purged with pure nitrogen. The net transmission T of the gas sample is obtained by division with this reference spectrum which integrates the contribution of the optics of the spectrometer, of the emission spectrum of the source and of the response of the detectors, both these being likely to drift over time.

The absorbance is calculated using the Beer-Lambert law from the relationship A=log (1/T).

The products are identified by comparison with reference spectra stored in memory, each spectrum corresponding to a known product.

In order to quantify the compounds thus identified, calibration samples are used, assuming that the area under the peaks is proportional to the number of vibrating bonds per unit of volume.

Figure 4:
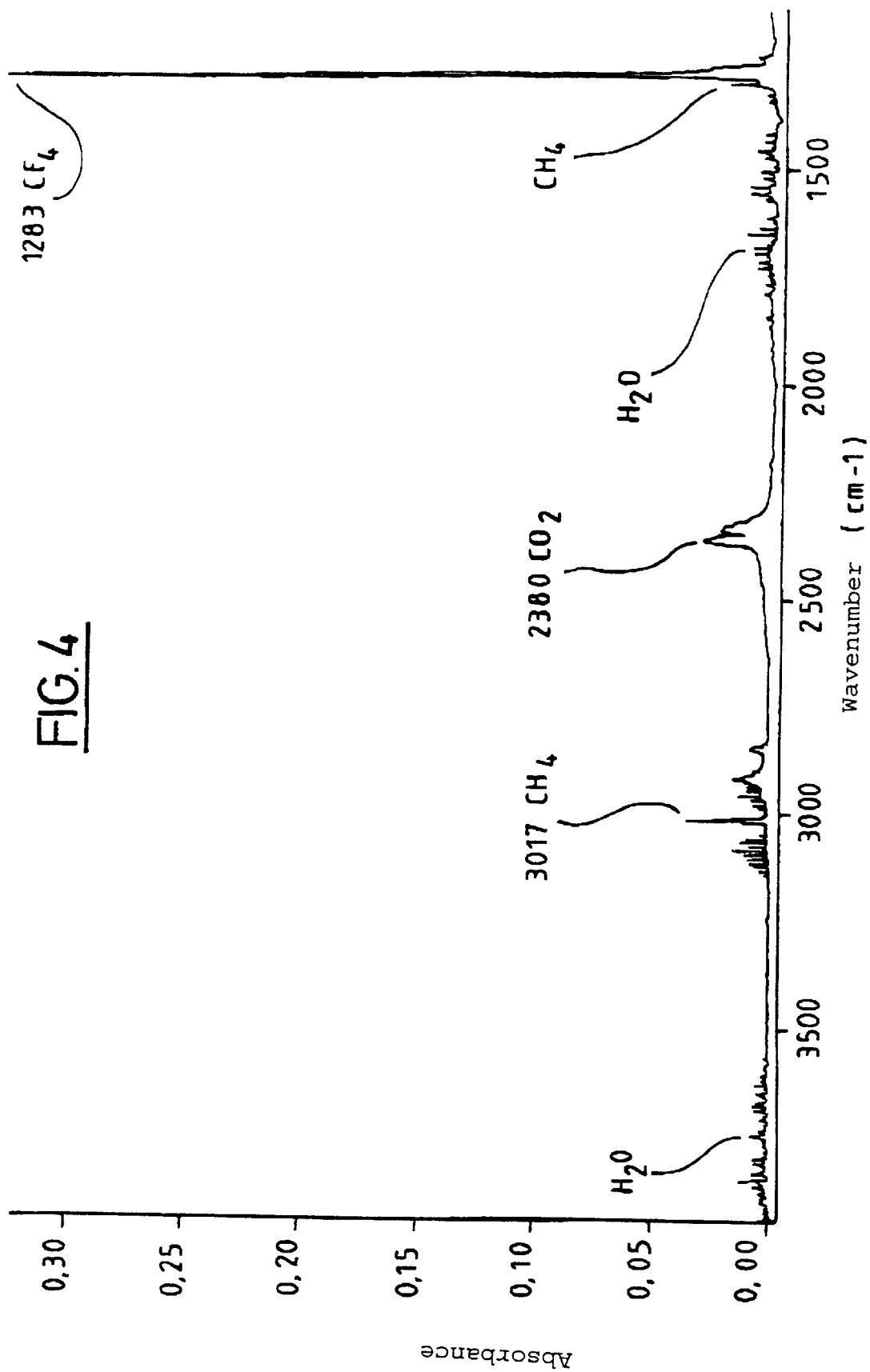
FIG. 4 is an infrared spectrum of the krypton as it leaves the apparatus in FIG. 1 in the absence of plasma.

Referring first of all to FIG. 4, it may be seen that the krypton analysis shows peaks at 1283 $cm^{-1}$ and at 3017 $cm^{-1}$, these corresponding respectively to $CF_4$ and to $CH_4$. These peaks correspond to initial concentrations in the krypton to be purified of 172 ppm of $CF_4$ and of 335 ppm of $CH_4$.

Moreover, peaks characteristic of $H_2O$ are observed in the region of 1500 $cm^{-1}$ and at wavenumbers greater than 3500 $cm^{-1}$, as well as peaks characteristic of residual atmospheric $CO_2$ in the compartment of the spectrometer, at 2380 $cm^{-1}$.

Moreover, it should be pointed out that the gas to be purified contains no other impurities at an appreciable concentration.

Figure 5:
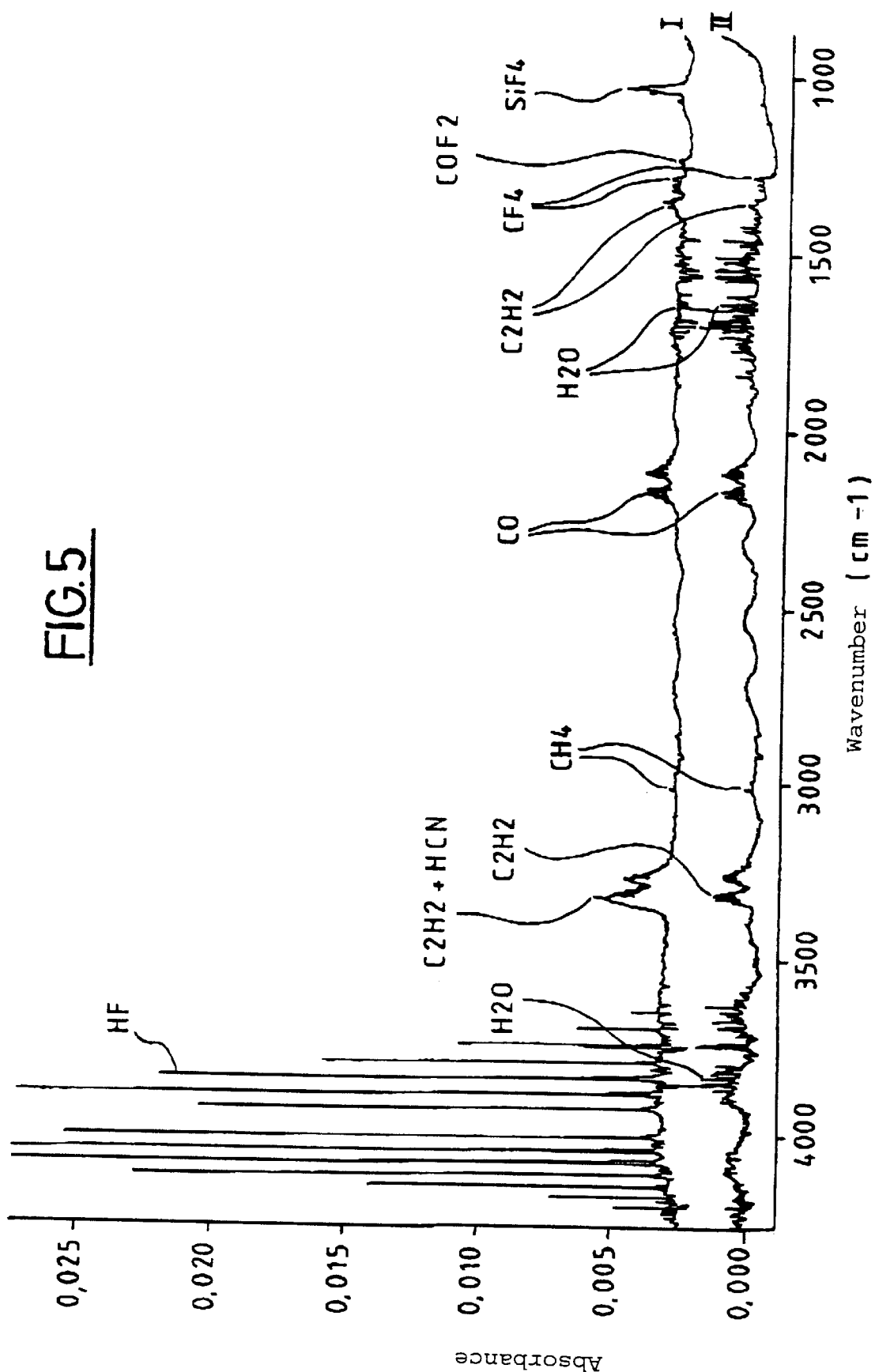
FIG. 5 shows infrared spectra of the krypton as it leaves the dielectric tube after treatment by the plasma and after passing over the soda-lime and then over a silica gel.

Referring now to FIG. 5, this figure shows the absorbance spectrum of krypton as it leaves the discharge (curve I) and as it leaves the apparatus (curve II).

As previously, the gaseous effluent to be treated consists of krypton, at a flow rate of 20 standard 1/min (slm), i.e. 1.2 $m^3$/h, and an incident microwave power of 1500 W.

In order to improve the execution of the process for converting $CF_4$ into reactive species, oxygen is added to the krypton before it flows through the dielectric tube 16.

However, the permissible oxygen concentrations in such a surface-wave plasma generated in krypton are very limited compared to plasmas generated in other gases. More particularly, above an oxygen concentration approximately of the same order of magnitude as that of the $CF_4$ existing in the incident gas, the plasma changes very rapidly in colour and becomes unstable and multifilamentary. Under the conditions in question, the maximum oxygen flow rate is preferably fixed at 20 standard $cm^3$/min (sccm).

The impedance tuning of the surfatron-guide 10 is adjusted beforehand, by acting on the length of the gap 76, on the position of the coaxial tuning plunger 46 and on the position of the waveguide plunger 50.

It should be pointed out that only the latter two adjustments, namely that of the tuning plunger 46 and the waveguide plunger 50, may be made in real time, the plasma having been struck, using the operating rods 53 and 54.

Moreover, the gap 76 can only be adjusted by successive approximations, the modifications being made without striking the plasma in order not to expose the operator to leakage radiation incompatible with the safety standards.

Having tuned the system, a reflective power of only a few watts, i.e. less than 1% of the incident power, is obtained.

Having established the discharge, analysis upstream of the cooling cartridge 38 shows (curve I) a considerable reduction in the height of the peaks characteristic of $CF_4$ and $CH_4$, respectively at 1283 $cm^{-1}$ and 3017 $cm^{-1}$, despite an increase in the scale of the ordinates by a factor of 10 and the appearance of peaks characteristic of products formed by the reactions in the discharge, consisting, on the one hand, of acid species such as HF, $COF_2$, $SiF_4$ and HCN, and, on the other hand, of Co and $C_2H_2$.

Curve II shows that the acid species are no longer detectable downstream of the silica-gel cartridge.

Quantitative evaluation of the impurities in the krypton leaving thee apparatus, carried out by a comparison with Fourier transform infrared spectrometry signals obtained from a calibration mixture of $CF_4$ and $CH_4$, shows a residual concentration of 0.3 ppmv in the case of $CF_4$ and of 3 ppmv in the case of $CH_4$. A considerable reduction in the concentration of impurities, in particular $CF_4$, is therefore observed, which lies below the specification limits in the regulations.

With regard to methane, it would be possible to lower the residual concentrations further using conventional techniques, by adding an additional stage using thermal treatment techniques of the "deoxo" type which makes it possible to destroy $CH_4$ in a conventional manner, this stage being mounted upstream of the apparatus, so as to avoid any deposition in the discharge tube, or else an additional plasma-treatment stage capable of operating at higher oxygen flow rates for treatment of methane. It would then be necessary to provide, in addition, a decarbonation unit for removing the residual $CO_2$.

Moreover, it will be noted that the residual CO concentration in the purified gas is of the order of the average legal exposure value i.e. 50 ppmv. However, it is possible to extract it easily from the purified gas by subsequent cryogenic distillation steps for the purpose of discharging it into the atmosphere.

Furthermore, both $C_2H_2$ and $CO_2$ may be very easily removed by adsorption on a molecular sieve.

In the exemplary embodiment described in FIG. 1, the gas dehydration unit consists of a silica gel. However, it is possible to replace this gel with a molecular sieve, for example of the "13X" type. Furthermore, a particulate filter may be placed downstream of the sieve so as to prevent solid carbon-containing particles from appearing on the exit side of the apparatus.

Furthermore, the apparatus may advantageously be completed by a conventional type of humidifier placed upstream of the soda lime so as to avoid the loss of efficiency resulting from progressively drying the latter, due to the effect of the flow of the gas to be purified in continuous operation, and bringing the flowing gas into contact with water so that this gas becomes laden with vapour.

Moreover, the description just given applies to the purification of krypton and of xenon, but of course the purification process described above also applies to any type of plasmagenic gas, in particular argon, and in general to the purification of gases such as Ar, Ne, Kr, Xe, He, $O_2$, $CO_2$, and $H_2$.

However, the invention makes it possible to purify krypton particularly effectively, this gas being capable of generating a plasma having a relatively long residence time and the atoms of which are relatively cold.

Moreover, the impurities mentioned above mainly consist of $CF_4$ and $CH_4$, but of course the invention also applies to the purification of gases containing other impurities, in particular other perfluorinated gases or gaseous hydrofluorocarbons.

Finally, in the above description of the invention the plasma is created using a surfatron-guide. As a variant, it is also possible to provide the apparatus with other high-frequency plasma-creating devices, for example a surfaguide or a "ro-box" with regard to the surface waves, or optionally a resonant-cavity device of known type, or else one of the conducting structures for field propagation which are also known: ladder, spiral or helix structure going around the outside of the dielectric tube.

In this latter embodiment, in which the travelling wave is not a surface wave, the longitudinal dimension of the plasma is adjusted by sizing the plasma-creating device appropriately so that the plasma extends over a sufficient length along the discharge tube, in order to obtain the desired length of plasma.

The description of the invention given above was applied to the purification of krypton or of xenon, or to a mixture of these two gases.

Of course, as mentioned previously, the invention also applies to the treatment of other plasmagenic gases, and in particular to the treatment of nitrogen, a gas in which the plasmas reach substantially higher temperatures than in other gases, such as argon.

In this case, the coolant flowing through the chamber 68 delimited by the dielectric tube and the outer coaxial wall 66 of the sleeve 19 preferably consists of an isoparaffinic alpha-olefin polymer (AOP) sold by the company Lubri Delta Inc., Quebec, conventionally used in hydraulic circuits.

Conventionally, a surface-wave discharge in nitrogen has fewer radial contractions than an argon, krypton or xenon plasma, and the light-emitting region is radially delocalized throughout the cross-section of the discharge tube.

In order to minimize the plasma density close to the inner wall of the tube, three parameters must be determined in the case of generating a plasma in nitrogen, namely: the internal diameter of the discharge tube, the diameter of the two orifices made in the constituent wall of the exciter for passage of the tube, and the amount of thinning of the wall of the exciter close to the incident-wave concentration region 76.

Thus, while the internal diameter of the discharge tube is chosen to be equal, for example, to 4 mm in the case of krypton or xenon, in the case of generating a plasma in nitrogen, the internal diameter of the tube 16 is increased to a value equal to 14 mm so as to be able to increase the total flow rate of gas to be purified for a given residence time in the discharge, without appreciably decreasing the efficiency of conversion of the impurities to be treated, and at the same time minimizing the plasma density close to the inner wall of the tube.

However, it is observed that above a certain diameter the efficiency of impurity destruction decreases, in particular because of the decrease in the density of the discharge. Thus, an internal diameter equal to 10 mm is preferably chosen.

Moreover, in order to avoid a reduction in the energy efficiency in the case of the use of nitrogen as the plasmagenic gas, the orifice made in the wall of the exciter for passage of the discharge tube 16, close to the incident-wave concentration region at gap 66 is chosen to be equal to approximately 13 mm in the case of the use of a discharge tube 16 having an internal diameter of 10 mm and a thickness of 0.5 or 1 mm. The other orifice, provided on the opposite side from the first, in the wall of the exciter 10 for passage of the sleeve 19 and of the tube 16 has a diameter approximately equal to 22 mm, for a sleeve 19 having an external diameter of between 16 and 18 mm.

Finally, it will be noted that, in the exemplary embodiment described above, the cross-section of the wall of the surfatron-guide 10 close to the gap 76 is thinned down by removing material from the outer wall of the waveguide 12 so as not to interfere with the excitation of the surface waves.

As a variant, it is also possible, in order to facilitate the operations of repairing the applicator should an arc develop within the gap, to provide the thinned-down part of the wall of the exciter in the form of a circular added piece provided with an adjustment rim and welded to the rest of the wall of the exciter.

We claim:

1. A process for purifying a gas, comprising the steps of:
   flowing the gas to be purified through a hollow dielectric tube;
   creating an electric field in the gas to be purified by a traveling electromagnetic wave which travels in the dielectric tube and creates, in the gas, an atmospheric-pressure plasma which is not in local thermodynamic equilibrium, for the purpose of dissociating impurities in the gas to form reactive compounds; and
   reacting the formed reactive compounds with a corresponding reactive material for eliminating said reactive compounds from the gas to be purified, wherein the gas to be purified consists essentially of argon, nitrogen, neon, krypton, xenon, helium, oxygen, carbon dioxide, hydrogen or a mixture thereof.

2. The process according to claim 1, wherein the electromagnetic wave is a surface wave produced by a surfatron-guide surface-wave exciter.

3. The process according to claim 1, wherein the electric field is created in a region of the dielectric tube, and the creating the electric field further includes a step of adjusting a longitudinal dimension of the region in order to adjust the length of the plasma.

4. The process according to claim 1, wherein oxygen is added to the gas to be purified, prior to the step of flowing the gas to be purified through the dielectric tube.

5. The process according to claim 1, wherein the corresponding reactive material comprises an alkaline material.

6. The process according to claim 5, wherein the alkaline material is soda lime or an alkaline aqueous solution.

7. The process according to claim 1, further comprising a step of dehydrating the gas to be purified after the step of reacting the formed reactive compounds with a corresponding reactive material.

8. A process for purifying a gas, comprising the steps of:
flowing the gas to be purified through a hollow dielectric tube;
creating an electric field in the gas to be purified by a traveling electromagnetic wave which travels in the dielectric tube and creates, in the gas, an atmospheric-pressure plasma which is not in local thermodynamic equilibrium, for the purpose of dissociating impurities in the gas to form reactive compounds; and
reacting the formed reactive compounds with a corresponding reactive material for eliminating said reactive compounds from the gas to be purified, wherein the gas to be purified comprises krypton or xenon.

9. The process according to claim 1, wherein the impurity in the gas to be purified is methane or a perfluorinated gas.

10. The process according to claim 9, wherein the impurity in the gas to be purified is tetrafluoromethane.

11. The process according to claim 9, wherein the gas to be purified is the product of an air distillation plant.

12. A process for purifying a gas, comprising the steps of:
flowing the gas to be purified through a hollow dielectric tube;
creating an electric field in the gas to be purified by a traveling electromagnetic wave which travels in the dielectric tube and creates, in the gas, an atmospheric-pressure plasma which is not in local thermodynamic equilibrium, for the purpose of dissociating impurities in the gas to form reactive compounds; and
reacting the formed reactive compounds with a corresponding reactive material for eliminating said reactive compounds from the gas to be purified,
wherein the gas to be purified is the product of a distillation process and wherein the gas to be purified consists essentially of argon, nitrogen, neon, krypton, xenon, helium, oxygen, carbon dioxide, hydrogen or a mixture thereof.

13. The process according to claim 12, wherein the electromagnetic wave is a surface wave produced by a surfatron-guide surface-wave exciter.

14. The process according to claim 12, wherein the electric field is created in a region of the dielectric tube, and the creating the electric field further includes a step of adjusting a longitudinal dimension of the region in order to adjust the length of the plasma.

15. The process according to claim 12, wherein oxygen is added to the gas to be purified, prior to the step of flowing the gas to be purified through the dielectric tube.

16. The process according to claim 12, wherein the corresponding reactive material comprises an alkaline material.

17. The process according to claim 16, wherein the alkaline material is soda lime or an alkaline aqueous solution.

18. The process according to claim 12, further comprising a step of dehydrating the gas to be purified after the step of reacting the formed reactive compounds with a corresponding reactive material.

19. The process according to claim 12, wherein the gas to be purified comprises krypton or xenon.

20. The process according to claim 12, wherein the impurity in the gas to be purified is methane or a perfluorinated gas.

21. The process according to claim 20, wherein the impurity in the gas to be purified is tetrafluoromethane.

22. A process for purifying a gas, comprising the steps of:
flowing the gas to be purified through a hollow dielectric tube;
creating an electric field in the gas to be purified by a traveling electromagnetic wave which travels in the dielectric tube and creates, in the gas, an atmospheric-pressure plasma which is not in local thermodynamic equilibrium, for the purpose of dissociating impurities in the gas to form reactive compounds; and
reacting the formed reactive compounds with a corresponding reactive material for eliminating said reactive compounds from the gas to be purified,
wherein the gas to be purified is supplied from a bottle in which the gas is stored under pressure, and wherein the gas to be purified consists essentially of argon, nitrogen, neon, krypton, xenon, helium, oxygen, carbon dioxide, hydrogen or a mixture thereof.

* * * * *